United States Patent

Kobayashi et al.

[11] Patent Number: 6,082,241
[45] Date of Patent: Jul. 4, 2000

[54] AUTOMATIC BRAKE BOOSTER

[75] Inventors: Isao Kobayashi, Saitama-Ken; Mamoru Sawada; Yuzo Imoto, both of Aichi-Pref, all of Japan

[73] Assignees: Jidosha Kiki Co., Ltd., Tokyo; Denso Corporation, Aichi-Pref, both of Japan

[21] Appl. No.: 09/233,581

[22] Filed: Jan. 19, 1999

[30] Foreign Application Priority Data

Feb. 13, 1998 [JP] Japan ..................... 10-48727
Dec. 11, 1998 [JP] Japan ..................... 10-352323

[51] Int. Cl.⁷ .......................... F15B 9/09; F15B 9/10
[52] U.S. Cl. ............................. 91/367; 91/376 R
[58] Field of Search ..................... 91/367, 376 R

[56] References Cited

U.S. PATENT DOCUMENTS

| | | | |
|---|---|---|---|
| 2,862,366 | 12/1958 | Ingres et al. | 91/376 R |
| 2,976,846 | 3/1961 | Stelzer | 91/376 R |
| 5,096,267 | 3/1992 | Volz . | |
| 5,802,952 | 8/1998 | Ikeda . | |

FOREIGN PATENT DOCUMENTS 3-31050  2/1991  Japan .

*Primary Examiner*—F. Daniel Lopez
*Attorney, Agent, or Firm*—Flynn, Thiel, Boutell & Tanis, P.C.

[57] ABSTRACT

An automatic brake booster includes a solenoid which drives a plunger, forming part of a valve mechanism, forward to switch a flow path in the valve mechanism, separately from an input shaft. A piston is mounted on the plunger, and the atmospheric pressure is introduced into an atmospheric pressure chamber disposed forwardly of the piston while a pressure which prevails in constant pressure chambers A, C is introduced into a negative pressure chamber disposed rearwardly of the piston, thus urging the piston rearward. Preferably, the piston has a pressure responsive area which is substantially equal to the pressure responsive area of an atmosphere valve seat formed on a plunger. This arrangement allows a variation in the output from the brake booster to be minimized or reduced substantially to zero if there is a variation in the magnitude of a negative pressure which is introduced into the constant pressure chambers A, C.

7 Claims, 1 Drawing Sheet

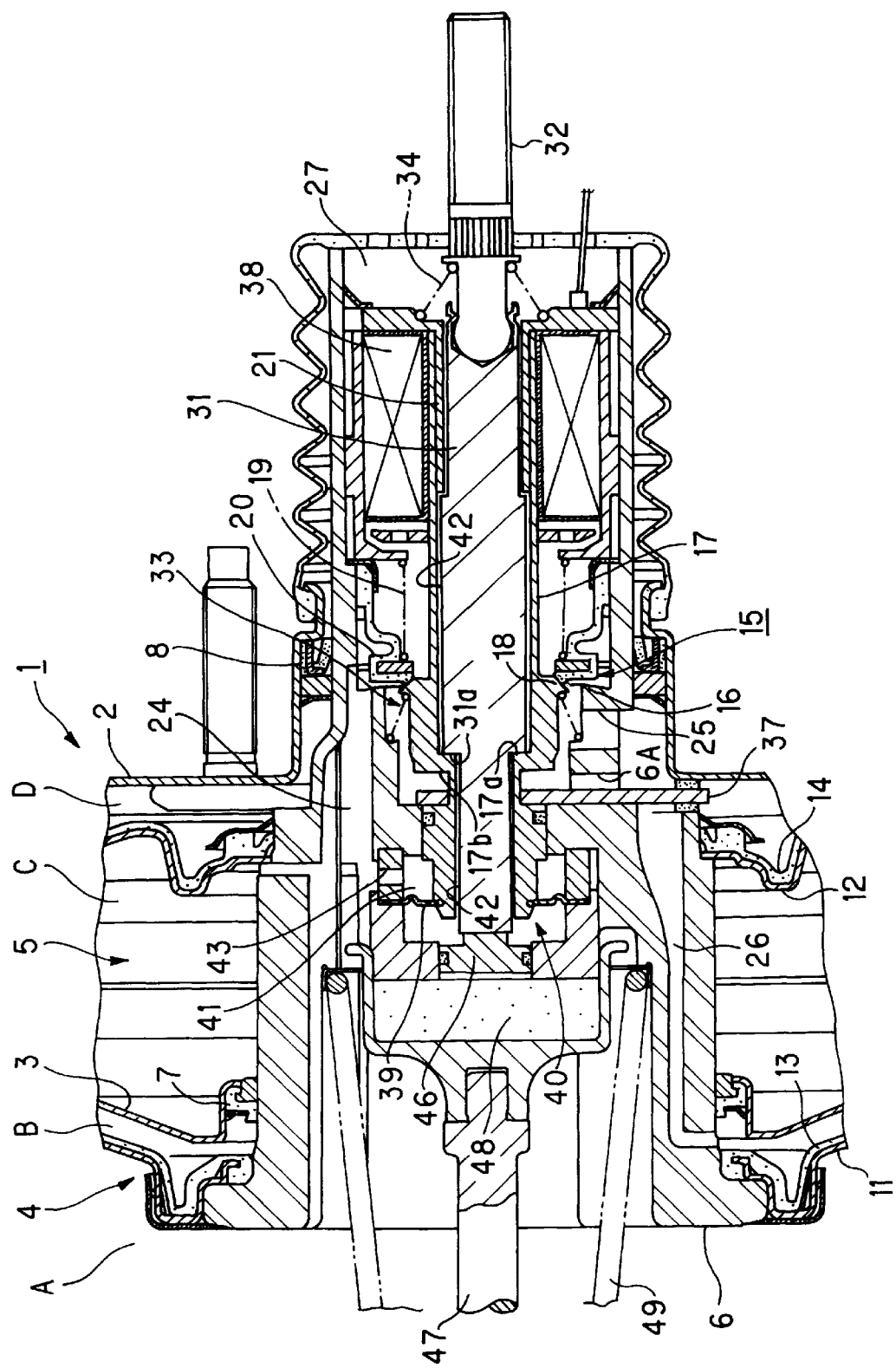

AUTOMATIC BRAKE BOOSTER

FIELD OF THE INVENTION

The invention relates to a brake booster, and more particularly, to an automatic brake booster which can actuates a brake booster by a solenoid without the depression of a brake pedal.

DESCRIPTION OF THE PRIOR ART

A brake booster is known in the art which comprises a valve body slidably disposed within a shell, a power piston mounted on the valve body, a constant and a variable pressure chamber defined across the power piston, a valve mechanism mounted on the valve body, and an input shaft for switching a flow path in the valve mechanism, and wherein the valve mechanism includes a vacuum valve seat formed on the valve body, a plunger slidably mounted on the valve body, an atmosphere valve seat formed on the plunger, and a valve element adapted to the driven from the rear side to be seated upon the vacuum valve seat and the atmosphere valve seat, respectively.

A brake booster of the kind described is arranged to be operated by the depression of the brake pedal, which causes the input shaft to be driven forward, thereby switching the flow path in the valve mechanism.

An automatic brake booster is also known in the art (see Japanese Laid-Open Patent Application No. 31,050/1991) which includes a solenoid which causes the plunger to be driven forward to switch the flow path in the valve mechanism, independently from the input shaft. Thus, if the input shaft is not driven forward, the solenoid is effective to drive the plunger forward to switch the valve mechanism, thereby allowing the brake booster to be automatically actuated.

With a conventional brake booster, when a force with which a brake pedal is depressed is controlled to a given magnitude, an output of a corresponding magnitude can be obtained. If the magnitude of a negative pressure which is introduced into the constant pressure chamber varies, the magnitude of the pressure which is introduced into the variable pressure chamber is automatically controlled in a corresponding manner, whereby an output of a given magnitude is obtained independently from a variation in the magnitude of the negative pressure in the constant pressure chamber.

However, with the conventional automatic brake booster, the plunger is subject to the pressure which prevails in the variable pressure chamber, and because an output from the solenoid is significantly reduced, the force by which the plunger is driven forward may vary as a result of a variation in the magnitude of the pressure introduced into the variable pressure chamber as the magnitude of the negative pressure introduced into the constant pressure chamber varies, if the output from the solenoid is maintained constant. Consequently, there remains a disadvantage that an output from the brake booster varies largely in response to a variation in the magnitude of the negative pressure introduced into the constant pressure chamber if the solenoid output is maintained constant.

SUMMARY OF THE INVENTION

In view of the foregoing, it is an object of the invention to provide an automatic brake booster which minimizes a variation in the output from the brake booster or reduces such variation substantially to zero, by minimizing a variation in the force which drives the plunger forward as a result of a variation in the negative pressure or reducing such variation substantially to zero.

The invention relates to an automatic brake booster including a valve body slidably disposed within a shell, a power piston mounted on the valve body, a constant and a variable pressure chamber defined across the power piston, a valve mechanism disposed within the valve body, and an input shaft associated with a valve mechanism for switching a flow path therein, wherein the valve mechanism includes a vacuum valve seat formed on the valve body, a plunger slidably mounted on the valve body, an atmosphere valve seat formed on the plunger, and a valve element driven from the rear side to be seated upon the vacuum valve seat and the atmosphere valve seat, respectively, and further including a solenoid which drives the plunger forward, independently from the input shaft, for switching a flow path in the valve mechanism;

characterized by a piston mounted on the plunger and which is subject to the atmospheric pressure and the pressure which prevails in the constant pressure chamber to urge the plunger rearward.

The invention relates to an automatic brake booster; in which the piston has a pressure responsive area which is substantially equal to the pressure responsive area of the atmosphere valve seat formed on the plunger.

The plunger which is driven forward by the solenoid is subject to a pressure differential between the atmospheric pressure and the pressure prevailing in the constant pressure chamber through the piston, whereby the piston and the plunger are urged rearward.

On the other hand, the plunger is subject to the pressure which prevails in the variable pressure chamber as in the prior art, or more precisely, the pressure in the variable pressure chamber and the atmospheric pressure, to urge it forwardly. Accordingly, when the pressure responsive area of the piston is chosen to be substantially equal to the pressure responsive area of the atmosphere valve seat formed on the plunger, the oppositely directed action of the atmospheric pressure can be balanced out, allowing the plunger to be subject to the pressure differential between the pressure in the variable pressure chamber and the pressure in the constant pressure chamber.

The pressure differential between the pressure in the variable pressure chamber and the pressure in the constant pressure chamber increases to a magnitude which corresponds to the force driving the plunger forward in accordance with an output from the solenoid, but remains constant when the solenoid output is constant. Thus, when the pressure differential remains constant, an output from the brake booster also remains constant. In this manner, an output from the brake booster is obtained, which depends on the magnitude of the solenoid output.

With this invention, the oppositely directed action of the atmospheric pressure to which the plunger is subject cannot always be balanced out. However, as compared with the conventional arrangement in which such piston is not provided, an influence of the variation in the pressure which prevails in the variable pressure chamber and acting upon the plunger can be reduced, thus allowing a variation in the output from the brake booster to be reduced for a constant output from the solenoid.

Above and other objects, features and advantages of the invention will become apparent from the following description of an embodiment thereof.

BRIEF DESCRIPTION OF THE DRAWINGS

FIG. 1 is a cross section of one embodiment of the invention.

DETAILED DESCRIPTION OF THE EMBODIMENTS

The embodiment shown in the drawing will now be described. In FIG. 1, a brake booster 1 of tandem type includes a shell 2, the interior of which is partitioned by a centrally located centerplate 3 into a front chamber 4 and a rear chamber 5. A tubular valve body 6 slidably extends through the inner periphery of the shell 2 at its rear end (or right end) and through the inner periphery of the centerplate 3 where a hermetic seal is maintained by seal means 7, 8, respectively.

A front power piston 11 and a rear power piston 12 are connected around the outer periphery of the valve body 6 at locations which are disposed within the front chamber 4 and the rear chamber 5, respectively, and a front diaphragm 13 and a rear diaphragm 14 are applied to the back surfaces of the power pistons 11 and 12, respectively. The front diaphragm 13 divides the front chamber 4 into a constant pressure chamber A and a variable pressure chamber B, while the rear diaphragm 14 divides the rear chamber 5 into a constant pressure chamber C and a variable pressure chamber D.

The valve body 6 contains a valve mechanism 15 which switches a communication between the constant pressure chambers A, C and the variable pressure chambers B, D. Specifically, the valve mechanism 15 comprises an annular valve seat 16 formed on the valve body 6, a tubular plunger 17 which is slidably disposed in the valve body 6 and extending through the vacuum valve seat, an annular atmosphere valve seat 18 formed around the outer periphery of the plunger 17 at its central portion, and a valve element 20 which is urged by a spring 19, from the rear side, as viewed in FIG. 1, to be seated upon either valve seat 16 or 18.

In the embodiment shown, the plunger 17 is slidably mounted on the valve body 6 by causing the outer periphery thereof at its front end to be slidably fitted into the inner peripheral surface of the valve body 6 while maintaining a hermetic seal therebetween and causing its outer peripheral surface at its rear end to be in sliding contact with the inner peripheral surface of a tubular holder 21 which is secured inside the valve body 6 toward its rear end.

A space located radially outward of a seat area between the vacuum valve seat 16 and the valve element 20 which moves into engagement with or disengagement from the valve seat 16 communicates with the constant pressure chamber A through a constant pressure passage 24 formed in the valve body 6 and also communicates with the constant pressure chamber C. The constant pressure chamber A communicates with a source of negative pressure through a tubing, not shown, which is used to introduce a negative pressure, whereby the negative pressure is normally introduced into the both constant pressure chambers A and C.

A space located radially inward of a seat area between the vacuum valve seat 16 and the valve element 20 and radially outward of a seat area between the atmosphere valve seat 18 and the valve element 20 which moves into engagement therewith or disengagement therefrom communicates with the variable pressure chamber D through a radial first variable pressure passage 25 formed in the valve body 6, and the variable pressure chamber D in turn communicates with the variable pressure chamber B through a second variable pressure passage 26 formed in the valve body 6.

Finally, a space located radially inward of the seat area between the atmosphere valve seat 18 and the valve element 20 communicates with the atmosphere through an atmosphere passage 27 formed in the valve body 6. It is to be noted that the atmosphere passage 27 communicates with the atmosphere on the outside of the valve body 6 through a plurality of slit-like paths formed in the outer periphery of the tubular holder 21.

A rod 31 is slidably disposed inside the tubular plunger 17, and has a rear end which is pivotally connected with the front end of an input shaft 32, which is in turn coupled to a brake pedal, not shown.

The outer peripheral surface of the rod 31 and the inner peripheral surface of the plunger 17 are both stepped. Specifically, a forwardly directed end face 31a of the rod 31 opposes a rearwardly directed end face 17a of the plunger 17, and a spring 33 disposed between the valve body 6 and the plunger 17 urges the plunger 17 rearward, thus bringing the both end faces 31a and 17a into abutment against each other. It is to be noted that the spring 33 has a resilience which is greater than the resilience of the spring 19.

A resilient member in the form of a spring 34 which has a greater resilience than the spring 19 is disposed between the input shaft 32 and the tubular holder 21 which is secured to the valve body 6. As a consequence, in the inoperative condition of the tandem brake booster 1, the valve element 20 is seated upon the atmosphere valve seat 18 to close this area, and the valve element 20 is removed from the vacuum valve seat 16 to open this area. In this inoperative condition, all of the chambers A, B, C and D communicate with each other, into which the negative pressure is introduced.

A radial bore 6A is formed in the valve body 6 at a location slightly forwardly of the first variable pressure passage 25, and receives a key member 37, which is known in itself, the key member 37 engaging a portion 17b of the plunger 17 which has a reduced diameter.

The key member 37 is displaceable within the radial bore 6A in the axial direction of the valve body 6. The key member 37 and the plunger 17 are displaceable axially of the valve body 6 within an extent defined by the axial length of the portion 17b having a reduced diameter.

When the tandem brake booster 1 is inoperative as shown in FIG. 1, the key member 37 is brought into abutment against the rear wall of the shell 2, thereby maintaining the key member 37 and the plunger 17 at advanced positions relative to the valve body 6. This reduces a lost motion of the input shaft 32 at the commencement of operation of the tandem brake booster 1.

The tubular holder 21 which is secured to the valve body 6 carries a solenoid 38, which may be utilized to drive the plunger 17 forward against the resilience of the spring 33, thereby switching the flow path in the valve mechanism 15.

In the present embodiment, a piston 39 in the form of a diaphragm is attached to the free end of the plunger 17. Specifically, the diaphragm piston 39 has its inner periphery connected to the front end of the plunger 17, and then extends radially outward of the plunger 17 to have its outer periphery connected to the valve body 6, thus defining an atmospheric pressure chamber 40 and a negative pressure chamber 41 on the front and the rear side of the piston 39.

A groove-shaped path 42 is formed in either the outer peripheral surface of the rod 31 or the inner peripheral surface of the plunger 17 to introduce the atmosphere into the atmospheric pressure chamber 40. On the other hand, a negative pressure within the constant pressure passage 24 or in the constant pressure chambers A, C is introduced into the negative pressure chamber 41 through a path 43 formed in the valve body 6.

Accordingly, the piston 39 is subject to a pressure differential between the atmosphere in the atmospheric pressure chamber 40 and the negative pressure in the constant pressure chambers A, C which is introduced into the negative pressure chamber 41, whereby the plunger 17 is urged rearward. Under the servo balance condition of the brake booster 1 or when fluid pressure is introduced into the variable pressure chambers B, D and the valve element 20 is simultaneously seated upon both the vacuum valve seat 16 and the atmosphere valve seat 18, the atmosphere valve seat 18 formed on the plunger 17 is subject to the pressure differential between the pressure within the variable pressure chamber which prevails toward the first variable pressure passage 25 and the atmospheric pressure, the differential pressure urging the plunger 17 forwardly.

In the present embodiment, the pressure responsive area of the piston 39 is chosen to be substantially equal to the pressure responsive area of the atmosphere valve seat 18 formed on the plunger 17, whereby a balance is achieved between the action of the atmospheric pressure which acts upon the piston 39 to urge the plunger 17 rearward and the action of the atmospheric pressure which acts on the atmosphere valve seat 18 to urge the plunger 17 forwardly. As a result, the plunger 17 is subject to a pressure differential between the pressure within the constant pressure chamber which acts upon the piston 39 and the pressure within the variable pressure chamber which acts upon the atmosphere valve seat 18 formed on the plunger 17.

A plate plunger 46 is slidably fitted into the free end of the valve body 6 in axial alignment therewith while maintaining a hermetic seal therebetween, thus defining the atmospheric pressure chamber 40 within the valve body 6. The front end face of the rod 31 is disposed in abutment against the rear end face of the plate plunger 46.

An output shaft 47 is disposed forwardly of the plate plunger 46, and is formed at its one end with a recess which receives a disc-shaped reaction disc 48 and which is slidably fitted around the outer periphery of the front end of the valve body 6, while the other or the front end of the output shaft 41 projects externally through the front wall of the shell 2 while maintaining a hermetic seal therebetween, the front end being coupled to a piston of a master cylinder, not shown.

A return spring 49 is disposed between the front wall of the shell 2 and the valve body 6, thus normally maintaining the valve body 6 and its associated members in their inoperative positions shown.

In operation, when a brake pedal is depressed to drive the input shaft 32 and its integral rod 31 forward, the plunger 17 is driven forward through the end face 17a which is in abutment against the end face 31a of the rod 31, thus switching the flow path in the valve mechanism 15 in a similar manner as occurs in a conventional brake booster to actuate the brake booster 1.

On the other hand, when the brake booster 1 is to be operated as an automatic brake which operates without the depression of a brake pedal, the solenoid 38 is energized by a controller, not shown, thus driving the plunger 17 forward, again switching the flow path in the valve mechanism 15 in the similar manner as occurs in the conventional brake booster to actuate the brake booster 1.

When the brake booster operates as an automatic brake, there is obtained a servo balance condition of the brake booster which depends on an output from the solenoid 38 or the force which drives the plunger 17 forward. Under the servo balance condition, a fluid pressure which depends on the magnitude of the output from the solenoid 38 is introduced into the variable pressure chambers B, D, and the valve element 20 of the valve mechanism 15 is simultaneously seated upon both the vacuum valve seat 16 and the atmosphere valve seat 18.

Representing the force with which the plunger 17 is driven forward by an output from the solenoid 38 by Fsol, the force with which the plunger 17 is urged forwardly under the influence of the atmosphere valve seat 18 by F1, the force with which the plunger 17 is driven rearward by the spring 33 by Fspg and the force with which the plunger 17 is driven rearward by the piston 39 by F2, the following equality applies:

$$Fsol + F1 = Fspg + F2 \tag{1}$$

Assuming that the atmosphere valve seat 18 has a pressure responsive area which is equal to the pressure responsive area of the piston 39, which is denoted by S, and denoting the atmospheric pressure by P1, the pressure in the constant pressure chamber by P0, and the pressure in the variable pressure chamber by Pv, the forces F1 and F2 can be expressed as follows:

$$F1 = (P1 - Pv)S \tag{2}$$

$$F2 = (P1 - P0)S \tag{3}$$

The substitution of equations (2) and (3) into the equation (1) yields the following:

$$Fsol = (Pv - P0)S + Fsp \tag{4}$$

The equation (4) means that when both the atmosphere valve seat 18 and the piston 39 have an equal pressure responsive area, the atmospheric pressure P1 in the equation (1) to (3) is balanced out. In the equation (4), Fspg has a constant magnitude.

Thus, when the force Fsol with which the plunger 17 is driven forward by an output from the solenoid 38 has a constant magnitude, the difference (Pv−P0) between the pressure Pv in the variable pressure chamber and the pressure P0 in the constant pressure chamber remains constant, whereby an output from the brake booster 1 also remains constant.

However, the negative pressure which is introduced into the constant pressure chambers A, C has a magnitude P0 which does not remain constant, but varies in accordance with the driving condition of a vehicle. However, when the magnitude of the force Fsol with which the plunger 17 is driven forward is maintained constant, the difference (Pv−P0) between the pressure Pv of the variable pressure chamber and the pressure P0 of the constant pressure chamber is maintained constant. In other words, if the magnitude P0 of the negative pressure which is introduced into the constant pressure chambers A, C varies, the pressure Pv, the introduction of which into the variable pressure chamber is controlled by the valve mechanism 15, is controlled to a pressure which depends on the magnitude of the force Fsol with which the plunger 17 is driven forward. Accordingly, when the magnitude of the force Fsol is constant, the difference (Pv−P0) between the pressure Pv of the variable pressure chamber and the pressure P0 of the constant pressure chamber remains constant if there is a variation in the magnitude of the negative pressure which is introduced into the constant pressure chambers.

In this manner, an output from the brake booster which depends on the magnitude of the output from the solenoid 38 can be obtained without any influence of a variation in the magnitude of the negative pressure introduced into the constant pressure chambers.

In the above description of the embodiment, the pressure responsive areas of the atmosphere valve seat 18 and the piston 39 have been assumed to be equal to each other, but the invention is not limited thereto. When the pressure responsive area of the atmosphere valve seat 18 is different from the pressure responsive area of the piston 39, the oppositely directed actions acting upon the plunger which are caused by the atmospheric pressure P1 cannot be balanced out, and accordingly, when there is a variation in the magnitude of the negative pressure introduced into the constant pressure chambers, there occurs a variation in the output from the brake booster if the output from the solenoid 38 is maintained constant. However, as compared with a conventional brake booster which is not provided with the piston 39, it is possible to reduce such variation in the output from the brake booster.

While the above description has dealt with the application of the invention to a tandem brake booster, it should be understood that the invention is not limited thereto.

While the invention has been disclosed above in connection with an embodiment thereof, it should be understood that a number of changes, modifications and substitutions therein are possible from the above disclosure without departing from the spirit and the scope of the invention defined by the appended claims.

What is claimed is:

1. An automatic brake booster including a valve body slidably disposed within a shell, a power piston mounted on the valve body, a constant and a variable pressure chamber defined across the power piston, a valve mechanism disposed within the valve body, an input shaft associated with the valve mechanism for switching a flow path in the valve mechanism, wherein the valve mechanism includes a vacuum valve seat formed on the valve body, a plunger slidably mounted on the valve body, an atmosphere valve seat formed on the valve plunger and a valve element urged from the rear side to be seated upon the vacuum valve seat and the atmosphere valve seat, further including a solenoid which drives the plunger forward to switch the flow path in the valve mechanism, independently from the input shaft;

characterized by a piston mounted on the plunger and which is subject to the atmospheric pressure and a pressure which prevails in the constant pressure chamber to urge the plunger rearward.

2. An automatic brake booster according to claim 1 in which the piston has a pressure responsive area which is substantially equal to the pressure responsive area of the atmosphere valve seat formed on the plunger.

3. An automatic brake booster according to claim 2, further including a rod slidably disposed in the valve body and connected to the input shaft, the plunger being slidably mounted around the outer periphery of the rod and being driven forward as the rod is driven forward.

4. An automatic brake booster according to claim 3 in which the atmosphere is introduced to the front side of the piston through a path formed between the rod and the plunger.

5. An automatic brake booster according to claim 1, further including a resilient member disposed between the input shaft and a holder which secures the solenoid to the valve body for urging the input shaft rearward.

6. An automatic brake booster according to claim 1, further including a rod slidably disposed in the valve body and connected to the input shaft, the plunger being slidably mounted around the outer periphery of the rod and being driven forward as the rod is driven forward.

7. An automatic brake booster according to claim 6, in which the atmosphere is introduced to the front side of the piston through a path formed between the rod and the plunger.

* * * * *